US012804252B2

(12) United States Patent
Mizutani

(10) Patent No.: US 12,804,252 B2
(45) Date of Patent: Nov. 17, 2026

(54) IMAGING DEVICE

(71) Applicant: CANON KABUSHIKI KAISHA, Tokyo (JP)

(72) Inventor: Shoma Mizutani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 18/830,848

(22) Filed: Sep. 11, 2024

(65) Prior Publication Data

US 2025/0106502 A1 Mar. 27, 2025

(30) Foreign Application Priority Data

Sep. 22, 2023 (JP) ................................ 2023-158726

(51) Int. Cl.
*H04N 23/60* (2023.01)
*H04N 23/73* (2023.01)

(52) U.S. Cl.
CPC ............ *H04N 23/64* (2023.01); *H04N 23/73* (2023.01)

(58) Field of Classification Search
CPC .............................. H04N 23/64; H04N 23/73
See application file for complete search history.

(56) References Cited

U.S. PATENT DOCUMENTS 8,368,769 B2 * 2/2013 Yumiki ................ G02B 15/144 348/341
2004/0239767 A1 * 12/2004 Stavely .................. H04N 23/64 348/E5.025
2010/0033587 A1 * 2/2010 Yumiki ................ G02B 15/144 348/341
2018/0051711 A1 * 2/2018 Kursula ................. H02K 7/061
2021/0258453 A1 * 8/2021 Watanabe ............ G02B 27/646
2021/0271325 A1 * 9/2021 Seo ...................... H04N 23/631
2025/0227381 A1 * 7/2025 Ito ........................ H04N 23/667

FOREIGN PATENT DOCUMENTS

JP 4028510 B2 12/2007
JP 2010206907 A * 9/2010 ............. H02N 2/103
JP 4649835 B2 3/2011

* cited by examiner

*Primary Examiner* — Sinh Tran
*Assistant Examiner* — Mehedi Nmn Hassan
(74) *Attorney, Agent, or Firm* — Cowan, Liebowitz & Latman, P.C.

(57) ABSTRACT

An imaging device includes an actuator, a light shielding curtain configured to operate by receiving a supply of motive power generated by the actuator to control exposure to an imaging element, a vibration unit configured to generate vibration by receiving a supply of the motive power generated by the actuator, and a switching unit configured to supply the motive power of the actuator to the light shielding curtain in a case where a mechanical shutter is used, and to supply the motive power of the actuator to the vibration unit in a case where an electronic shutter is used.

6 Claims, 19 Drawing Sheets

IMAGING DEVICE

BACKGROUND OF THE INVENTION

Field of the Invention

The present invention relates to an imaging device.

Description of the Related Art

Since the past, imaging devices have been equipped with a mechanical shutter including a front curtain and a rear curtain that adjusts the amount of exposure to an imaging element by controlling a difference between the time when the front curtain travels and the time when the rear curtain travels.

In addition, with recent technological advances in imaging elements, the speed at which image data is read out from each pixel has improved, and techniques of replacing the function of a mechanical shutter with an electronic shutter have been put to practical use.

Unlike a mechanical shutter, an electronic shutter does not generate any operating noise when in operation. This makes it possible for the electronic shutter to capture images without hesitation even in situations where silence is required, such as a situation where a musical instrument is being played at a concert or a situation where a golfer is swinging.

However, in a case where an electronic shutter is used, no sound is made even when an image capture button is pressed. This makes it difficult for an imaging device to allow a photographer to recognize the timing of image capture, which may cause the photographer to feel uneasy that image capture may not been performed correctly.

Examples of documents disclosing techniques for solving such problems include Japanese Patent No. 4649835 and Japanese Patent No. 4028510.

A camera disclosed in Japanese Patent No. 4649835 notifies a photographer by a vibration unit generating vibration as soon as an image capture button is pressed. This allows the camera to provide the benefit of not making any sound during image capture, while still allowing the photographer to recognize the timing of image capture.

A camera device disclosed in Japanese Patent No. 4028510 uses a single actuator to achieve both the generation of vibration and the adjustment of the focus of a lens unit, and has a configuration that makes it possible to switch between a case where vibration is generated and a case where the focus of the lens unit is adjusted. This allows the camera device to hold a vibration function without increasing the size and weight of a main body.

However, the camera device disclosed in Japanese Patent No. 4028510 needs to adjust the focus of the lens unit during image capture until the moment a shutter is released, and thus the actuator cannot be used to generate vibration.

In addition, in the case of a camera having an interchangeable lens unit, an actuator for adjusting the focus of the lens unit is mounted on the lens unit. Therefore, in the case of such a camera, it is difficult to transmit motive power generated by the actuator to the camera body, which leads to a concern that it may not be possible to effectively apply vibration to the grip portion of the camera body.

SUMMARY OF THE INVENTION

According to an aspect of the present invention, there is provided an imaging device including an actuator, a light shielding curtain configured to operate by receiving a supply of motive power generated by the actuator to control exposure to an imaging element, a vibration unit configured to generate vibration by receiving a supply of the motive power generated by the actuator, and a switching unit configured to supply the motive power of the actuator to the light shielding curtain in a case where a mechanical shutter is used, and to supply the motive power of the actuator to the vibration unit in a case where an electronic shutter is used.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

An imaging device according to an embodiment includes an actuator, a light shielding curtain, a vibration unit, and a switching unit. The light shielding curtain operates by receiving a supply of motive power generated by the actuator to control the exposure to an imaging element.

The vibration unit generates vibration by receiving a supply of motive power generated by the actuator. The switching unit supplies the motive power of the actuator to the light shielding curtain in a case where a mechanical shutter is used, and supplies the motive power of the actuator to the vibration unit in a case where an electronic shutter is used.

In addition, the vibration unit may include a vibration member that vibrates in the normal direction of the imaging surface of the imaging element or a vibration member that vibrates within a predetermined angle range based on the normal direction of the imaging surface of the imaging element.

In addition, the vibration unit may generate vibration by applying force to an elastic member that biases a vibration member to cause elastic deformation and then releasing the elastic member.

In addition, the imaging device according to the embodiment may further include a cover member that covers at least a portion of the vibration unit.

In addition, in a case where images are captured continuously, the vibration unit may generate vibration at a constant timing relative to the timing of exposure to the imaging element.

In addition, the actuator may be a motor that rotates a rotor in a first direction in a case where a mechanical shutter is used, or rotates the rotor in a second direction which is a direction opposite to the first direction in a case where an electronic shutter is used.

Meanwhile, the embodiment to be described below is an example for realizing the present invention and should be modified or changed depending on the configuration of a device to which the present invention is applied and various conditions, and the present invention is not limited to the following modes. In addition, the present invention may be configured by appropriately combining some of the embodiments to be described below.

EMBODIMENT

Figure 1:
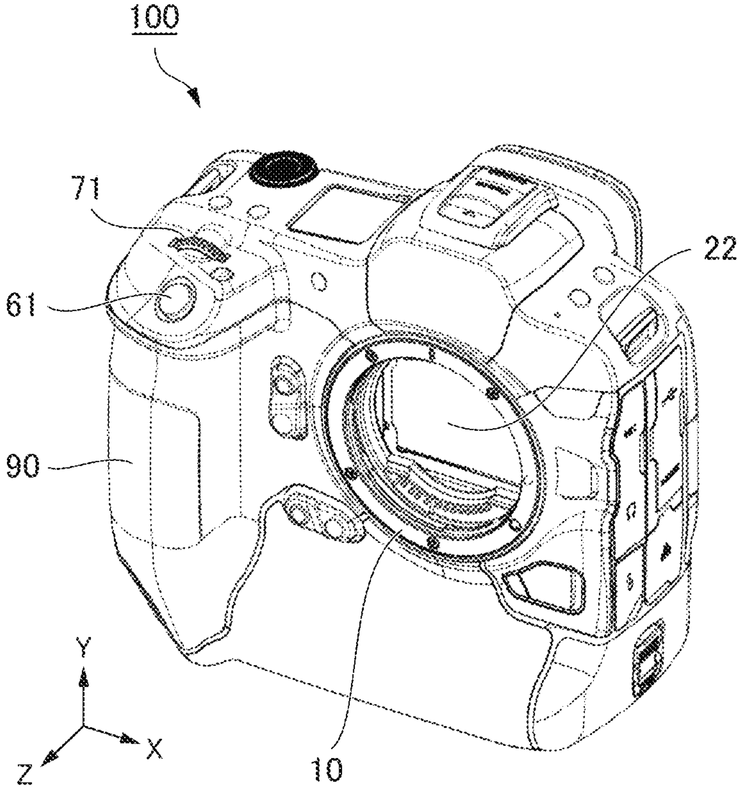
FIG. 1 is a perspective view of the front exterior of an imaging device according to an embodiment.
Figure 2:
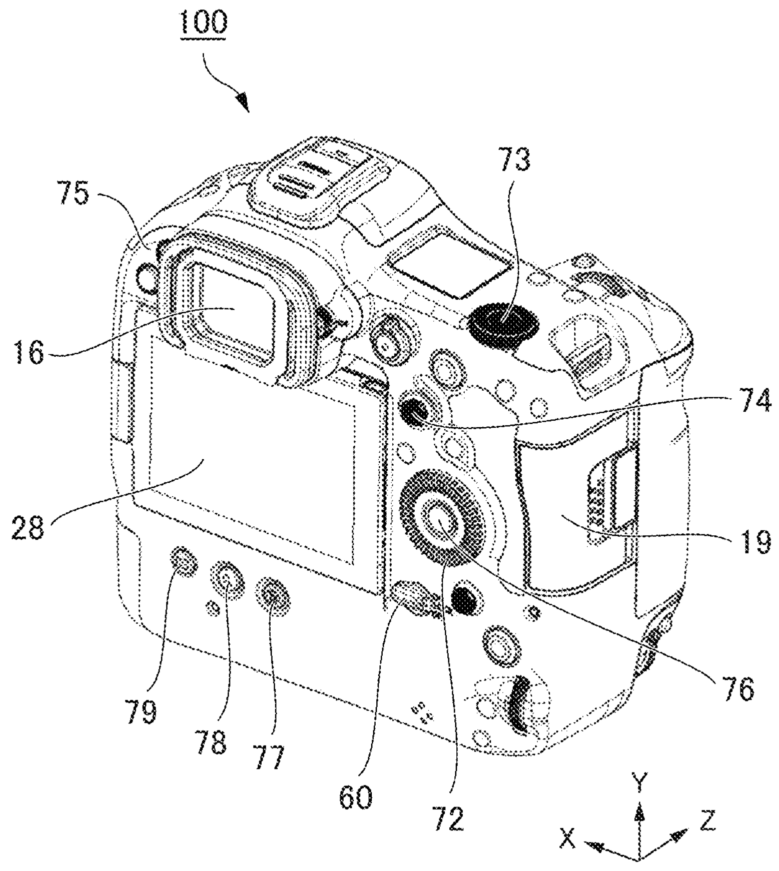
FIG. 2 is a perspective view of the rear exterior of the imaging device according to the embodiment.

First, the configuration of an imaging device according to an embodiment will be described with reference to FIGS. 1 and 2. FIG. 1 is a perspective view of the front exterior of the imaging device according to the embodiment. FIG. 2 is a perspective view of the rear exterior of the imaging device according to the embodiment.

Figure 3:
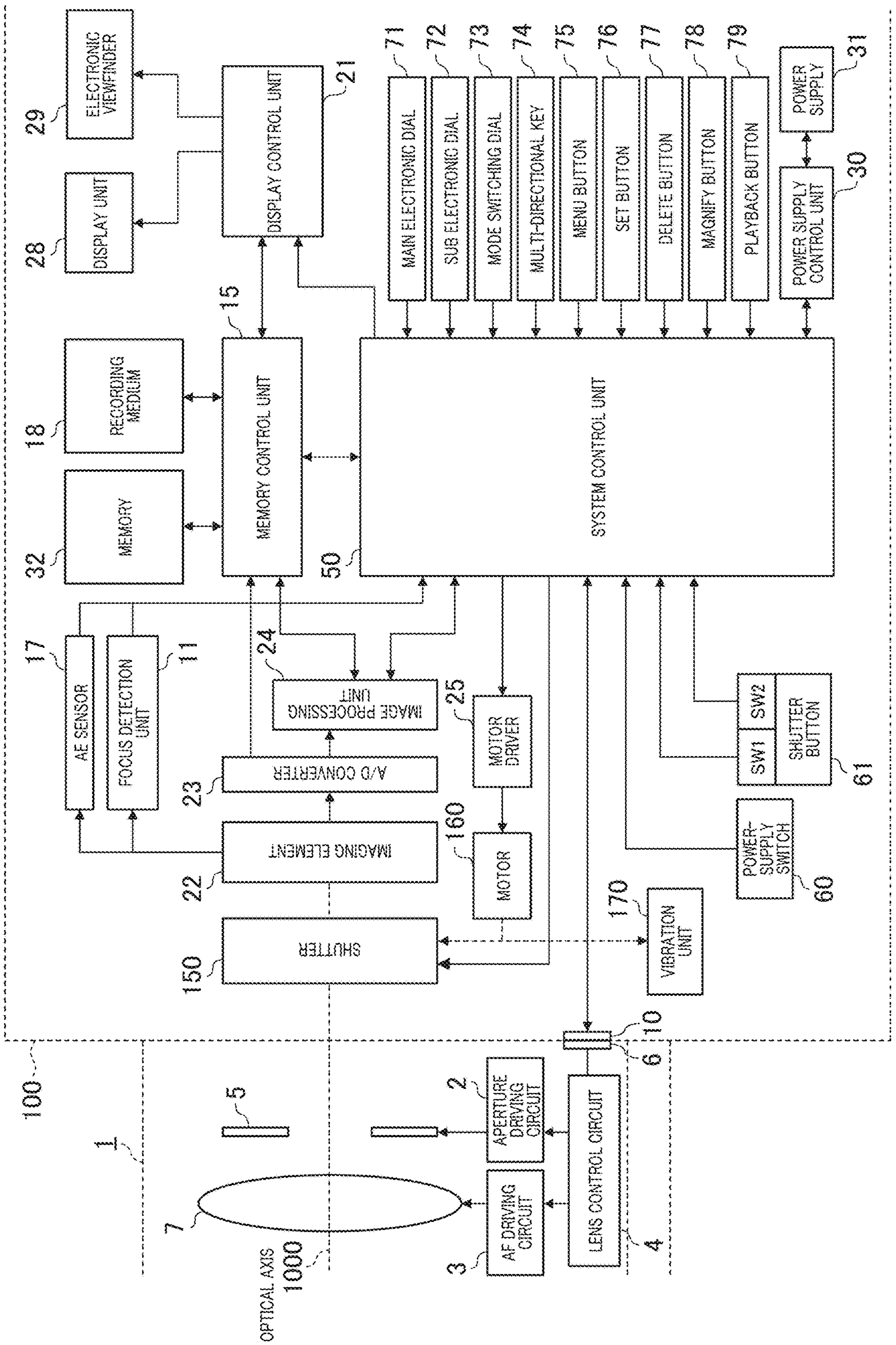
FIG. 3 is a block diagram illustrating an electrical configuration of the imaging device according to the embodiment.

A digital camera 100 has a detachable lens mount 10 to which a lens unit 1 shown in FIG. 3, which will be described later, can be attached. The lens mount 10 is provided with electronic contacts and operates a lens in conjunction with the digital camera 100, thereby allowing electrical communication.

The digital camera 100 can take a photograph by forming an image on an imaging element 22 through the lens unit 1.

The digital camera 100 has a front grip portion 90 which is grasped by a user during image capture, and a shutter button 61 which is disposed on the front grip portion 90. The shutter button 61 is a switch having two stages of detection timing in a push-in direction, and is a button for issuing an instruction to start image capture.

If the shutter button 61 is pressed, auto focus is started at a first detection timing (SW1). If the shutter button 61 is pressed further, image capture is started at a second detection timing (SW2).

In addition, the behavior of the shutter button 61 can be changed by a customization function when it is pressed down to the first detection timing (SW1). For example, the shutter button 61 can also be used to cause the digital camera 100 to execute only auto exposure rather than auto focus through the customization function.

An electronic viewfinder 29 is provided inside an eyepiece 16, and is capable of projecting a live-view image during image capture. By looking into the eyepiece 16, a user can concentrate on checking the subject and composition in a state where external light is blocked. In addition, the electronic viewfinder 29 can also project a menu screen and captured images similarly to a display unit 28.

The display unit 28 is provided on the rear of the digital camera 100 and is capable of displaying images and various types of information. In addition, the display unit 28 has a touch panel function and can detect a touch operation on the display surface.

A mode switching dial 73 is operated to switch the imaging mode. For example, the mode switching dial 73 makes it possible to switch the imaging mode to various imaging modes such as a shutter speed priority imaging mode, an aperture value priority imaging mode, and a video imaging mode.

A main electronic dial 71 and a sub electronic dial 72 are rotary operating members disposed on the upper surface of the digital camera 100, and make it possible to change setting values such as the shutter speed and aperture when operated by rotation. A SET button 76 is a push button and is mainly used to determine a selected item or the like.

A multi-directional key 74 is an operating member that can specify a total of eight directions including up, down, left, right, and diagonal directions in between, and can be operated according to the direction by tilting down the swingable multi-directional key 74.

Meanwhile, the operating members such as buttons, dials, and keys described above are disposed on the assumption that they will be operated in a state where a user grasps the front grip portion 90 with his or her right hand. For example, the shutter button 61 and the main electronic dial 71 are disposed at positions where they can be operated with the index finger of the right hand in a state where the front grip portion 90 is gripped with the little finger, ring finger, and middle finger.

In addition, for example, the mode switching dial 73, the sub electronic dial 72, and the multi-directional key 74 are disposed at positions where they can be operated with the thumb of the right hand in a state where the front grip portion 90 is gripped with the little finger, ring finger, and middle finger.

A menu button 75 is pressed to display on the display unit 28 a menu screen on which various detailed settings are possible. A user can intuitively perform various settings by performing an operation using the multi-directional key 74, the SET button 76, the touch panel function of the display unit 28, and the like in accordance with the menu screen.

A delete button 77 is a push button for executing the deletion of recorded captured images and video files. A magnify button 78 is an operation button for turning the magnification mode on and off during image capture or when a captured image is played back.

In addition, a user can change the magnification by operating the main electronic dial 71 after the magnification mode is turned on. A playback button 79 is pressed to play back a captured image. The display unit 28 can display the latest image among the images recorded in a recording medium 18.

A media slot cover 19 is a cover member of a slot in which the recording medium 18 is stored. A user can open the media slot cover 19 to insert and remove the recording medium 18 such as an SD card or a CF card.

A power-supply switch 60 is disposed on the rear side and can be used to turn the power supply of the digital camera 100 on and off.

Next, the electrical configuration and operation of the imaging device according to the embodiment will be described with reference to FIG. 3. FIG. 3 is a block diagram illustrating the electrical configuration of the imaging device according to the embodiment.

The lens unit 1 represents a lens that can be attached to the digital camera 100. An optical lens 7 is an optical member provided within the lens unit 1 and is usually composed of a plurality of lens groups. Here, for the purpose of simplification, the optical lens 7 is illustrated as a single lens in FIG. 3.

A lens communication terminal 6 is an electronic contact and can supply power to and communicate with the lens unit 1 from the digital camera 100 through the lens mount 10. The lens unit 1 includes a lens system control circuit 4 and can adjust the focus by an aperture driving circuit 2 controlling an aperture 5 and an AF driving circuit 3 moving a portion of the optical lens 7.

A shutter 150 is a mechanical focal plane shutter composed of two sets of light shielding curtains, a front curtain and a rear curtain, and is disposed in front of the imaging element 22. In addition, the shutter 150 can control the exposure time of the imaging element 22 by the travel timing of the light shielding curtain being controlled by a system control unit 50.

The imaging element 22 is a semiconductor component that converts an optical image into an electrical signal, and a charge-coupled device (CCD), a complementary metal-oxide-semiconductor (CMOS), or the like is used as the imaging element. The imaging element 22 also has an electronic shutter function, and can electronically control the exposure time by controlling the light accumulation time and readout timing of each pixel without using the above-described mechanical shutter 150.

The digital camera 100 can perform silent image capture in which no sound is generated by using an electronic shutter function. This makes it possible for the digital camera 100 to capture images without hesitation even in situations where silence is required, such as a situation where a musical instrument is being played at a concert or a situation where a golfer is swinging.

An AE sensor 17 can measure the luminance of a subject through the lens unit 1. A focus detection unit 11 outputs information on a defocus amount to the system control unit 50. Meanwhile, in some cases, the imaging element 22 has a function of fulfilling the role of the AE sensor 17 or the focus detection unit 11.

Based on this information, the system control unit 50 performs exposure control such as auto focus (AF) processing, auto exposure (AE) processing, and flash pre-emission.

An A/D converter 23 is a circuit for converting an analog signal output from the imaging element 22 into a digital signal. An image processing unit 24 performs predetermined pixel interpolation, resizing, color conversion processing, and the like on data from the A/D converter 23 or data from a memory control unit 15.

The output data from the A/D converter 23 is recorded in a memory 32 by the image processing unit 24 or the memory control unit 15. The memory 32 stores captured image data, display data to be displayed on the display unit 28 and the electronic viewfinder 29, and the like.

A display control unit 21 converts the data stored in the memory 32 and displays it on a liquid crystal display (LCD), an organic electroluminescent (EL) display, or the like that constitutes the display unit 28 and the electronic viewfinder 29.

As described above, SW1 is turned on midway through the operation of the shutter button 61 provided on the digital camera 100, that is, a so-called half-press (image capture preparation instruction). When SW1 is turned on, image capture preparation operations such as auto focus processing, auto exposure processing, auto white balance (AWB) processing, and flash pre-emission processing are started.

SW2 is turned on in a state where the shutter button 61 is pressed all the way, that is, during a so-called full press (image capture instruction). When SW2 is turned on, a series of image capture processing operations is started, from reading out the signal from the imaging element 22 to writing it to the recording medium 18 as an image file.

A motor driver 25 is responsible for controlling a motor 160. The motor 160 can drive the shutter 150 and a vibration unit 170. The mechanical configuration and driving unit of the shutter 150 and the vibration unit 170 will be described later. The system control unit 50 is a control unit composed of at least one processor or circuit, and is responsible for the overall control of the digital camera 100. The system control unit 50 accepts signals from various operating members and performs output, changes in settings, display instructions, and the like in response to the operations.

A power supply control unit 30 is constituted by a power supply detection circuit, a DC-DC converter, a switch circuit that switches between blocks to which electricity is applied, and the like, and detects whether a battery is installed, the type of battery, and the remaining battery power. In addition, the power supply control unit 30 controls the DC-DC converter on the basis of the detection result and instructions from the system control unit 50, and supplies the necessary voltage to each unit including the recording medium 18 for the necessary period.

A power supply 31 is used to drive the digital camera 100, and may be, for example, a primary battery such as an alkaline battery or a lithium battery, a secondary battery such as a NiCd battery, a NiMH battery, or a Li battery, an AC adapter, or the like.

Figure 4:
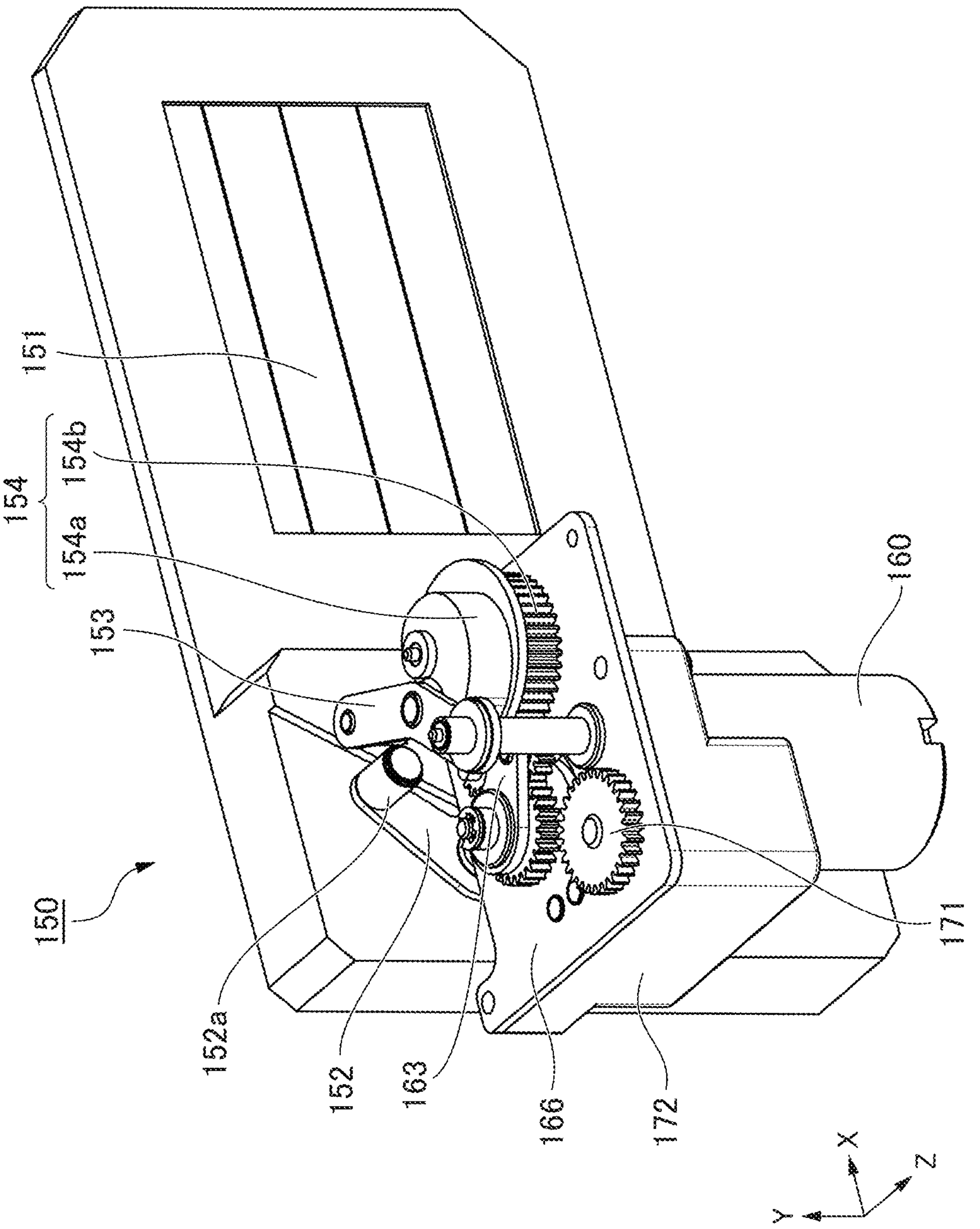
FIG. 4 is a perspective view of the exterior of a shutter and a vibration unit according to the embodiment.

Next, the configurations of the shutter 150 and the vibration unit 170 according to the embodiment will be described with reference to FIG. 4. FIG. 4 is a perspective view of the exterior of the shutter and the vibration unit according to the embodiment. The shutter 150 includes a light shielding curtain 151, and the time of exposure to the imaging element 22 can be adjusted by opening and closing the light shielding curtain 151.

The light shielding curtain 151 opens by applying force to a spring (not shown) to cause elastic deformation, and exposes the imaging surface of the imaging element 22. Meanwhile, hereinafter, the operation of applying force to the spring to cause elastic deformation will be referred to as "charge."

In addition, the light shielding curtain 151 is deployed by releasing the force and releasing the spring, and thus a beam of light incident on the imaging element 22 is blocked. In addition, the motor 160, the charge mechanism of the shutter 150, and the vibration unit 170 are disposed on a base member 166.

The base member 166 forms the front grip portion 90 of the digital camera 100 and is fastened to an exterior member (not shown).

The above-described spring can be charged by rotating a charge lever 152. The charge lever 152 includes a cylindrical contact portion 152*a*, and the charge lever 152 rotates when the contact portion 152*a* is pressed.

A cam lever 153 swings due to the rotation of a cam gear 154 and presses the contact portion 152*a*. The cam gear 154 is rotated by the driving force of the motor 160.

The vibration unit 170 is provided together with the driving mechanism of the shutter 150. The vibration unit 170 can generate vibration by the driving force of the motor 160 and notify a photographer of the vibration. In addition, the vibration unit 170 is covered by a cover member 172.

A pinion gear 161 is attached to the driving shaft of the motor 160 and meshes with a sun gear 162. A planetary carrier 163 is provided rotatably around the sun gear 162, and a planetary gear 163*a* provided on the planetary carrier 163 meshes with the sun gear 162.

The planetary gear 163*a* moves in the direction of rotation of the motor 160, so that the transmission of the driving force to the shutter 150 and the vibration unit 170 can be switched.

Figure 5:
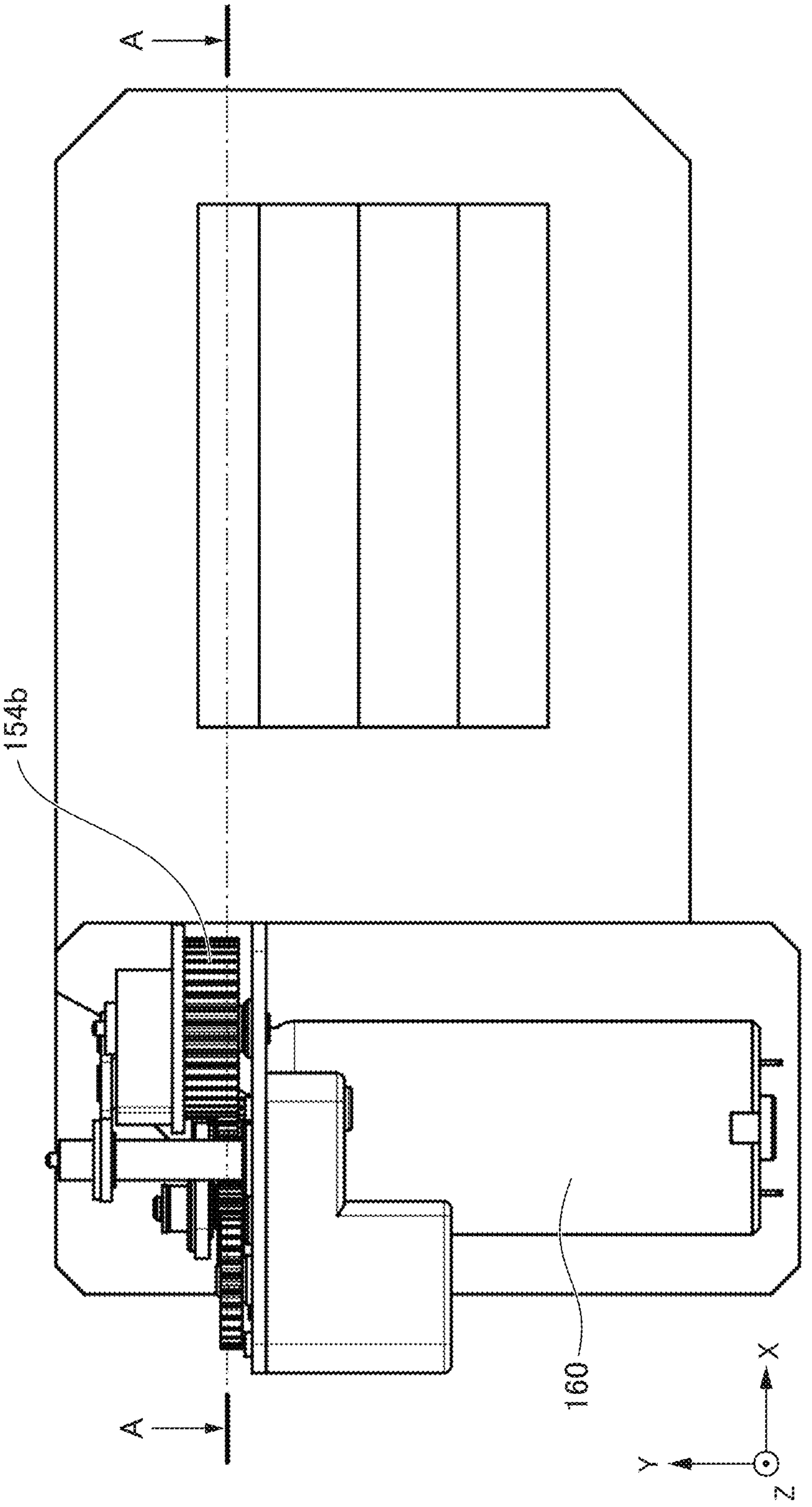
FIG. 5 is a diagram illustrating transmission of motive power to the shutter according to the embodiment.
Figure 6:
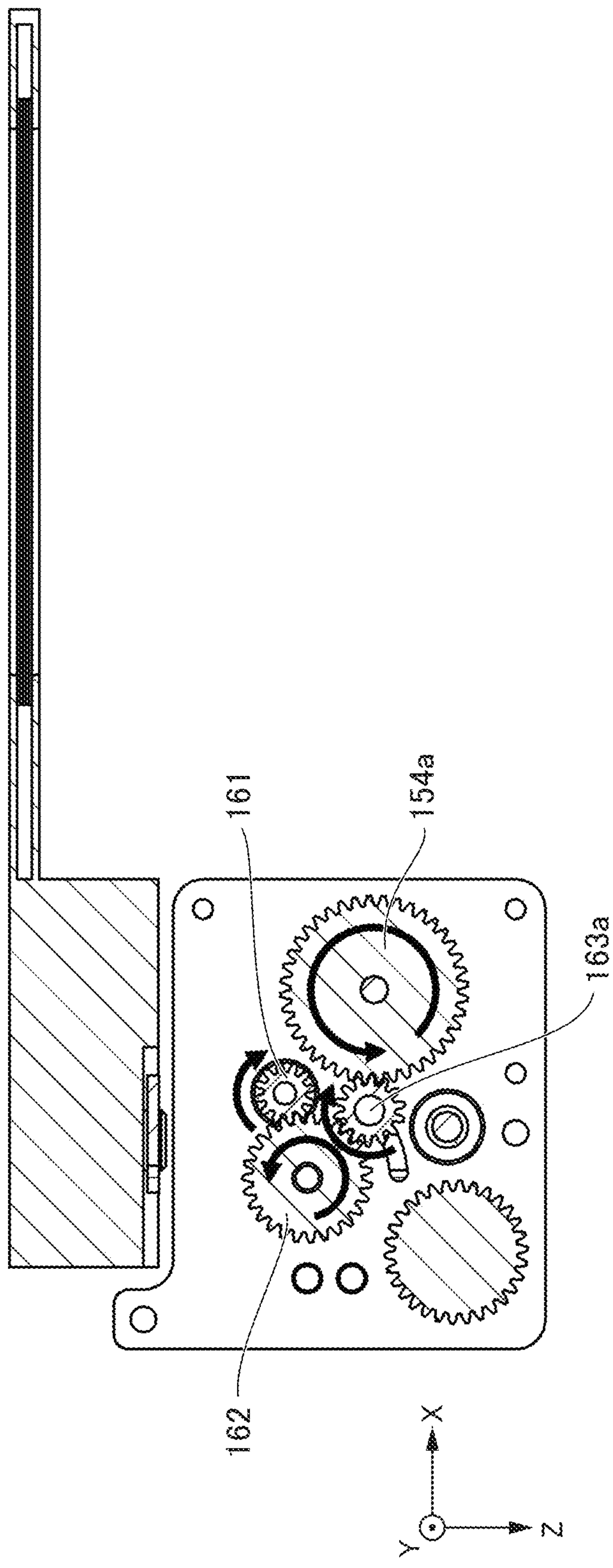
FIG. 6 is a diagram illustrating transmission of motive power to the shutter according to the embodiment.

Next, the transmission of motive power from the motor 160 to the shutter 150 will be described with reference to FIGS. 5 and 6. FIGS. 5 and 6 are diagrams illustrating the transmission of motive power to the shutter according to the embodiment. In addition, FIG. 5 is a front view of the shutter 150 and the vibration unit 170. On the other hand, FIG. 6 is a cross-sectional view along line A-A of the shutter 150 and the vibration unit 170.

As shown in FIG. 6, in a case where the pinion gear 161 attached to the driving shaft of the motor 160 rotates clockwise (hereinafter referred to as CW), the sun gear 162 rotates counterclockwise (hereinafter referred to as CCW). The rotation of the sun gear 162 causes the planetary gear 163*a* to move and mesh with a gear portion 154*a* provided on the cam gear 154, causing the cam gear 154 to rotate CCW.

Figure 7:
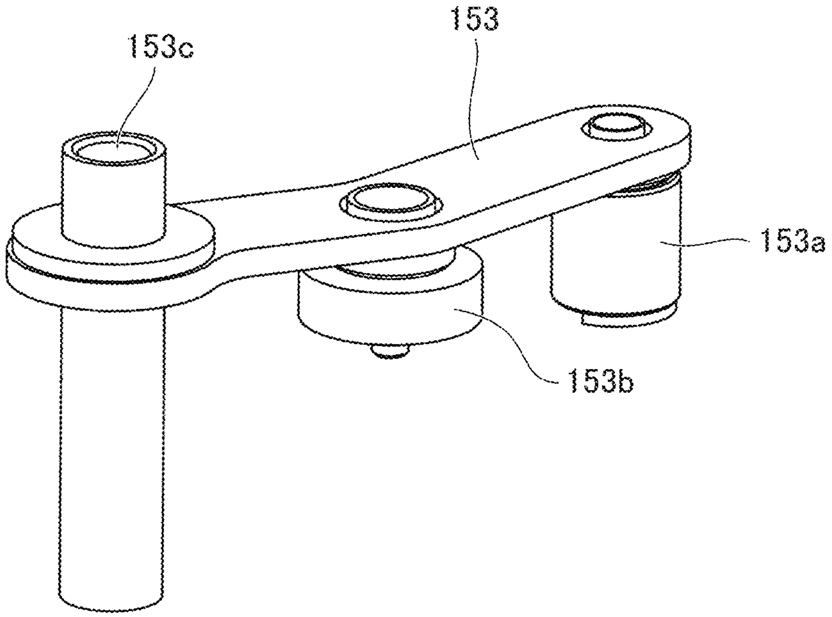
FIG. 7 is a perspective view of the exterior of a cam lever according to the embodiment.

Next, the operation of charging the spring to cause the light shielding curtain 151 of the shutter 150 to travel will be described with reference to FIGS. 7 to 10. FIG. 7 is a perspective view of the exterior of the cam lever according to the embodiment. The cam lever 153 has a pusher 153*a* for pressing the contact portion 152*a* of the charge lever 152 rotatably attached to its front end.

In addition, a cam follower 153*b* is rotatably mounted near the center of the cam lever 153. A sleeve portion 153*c* is attached to the rear end of the cam lever 153. The cam lever 153 swings around the sleeve portion 153*c*.

Figure 8:
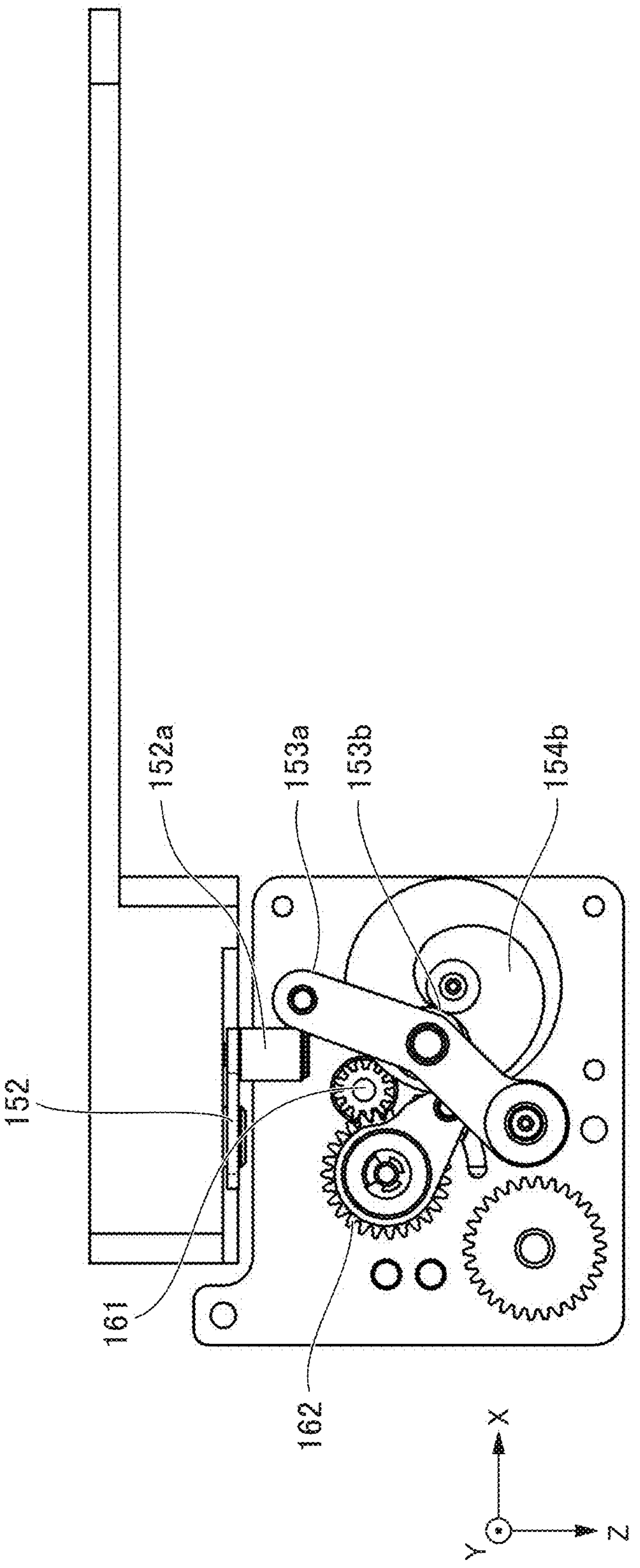
FIG. 8 is a diagram illustrating an operation of the shutter according to the embodiment.
Figure 9:
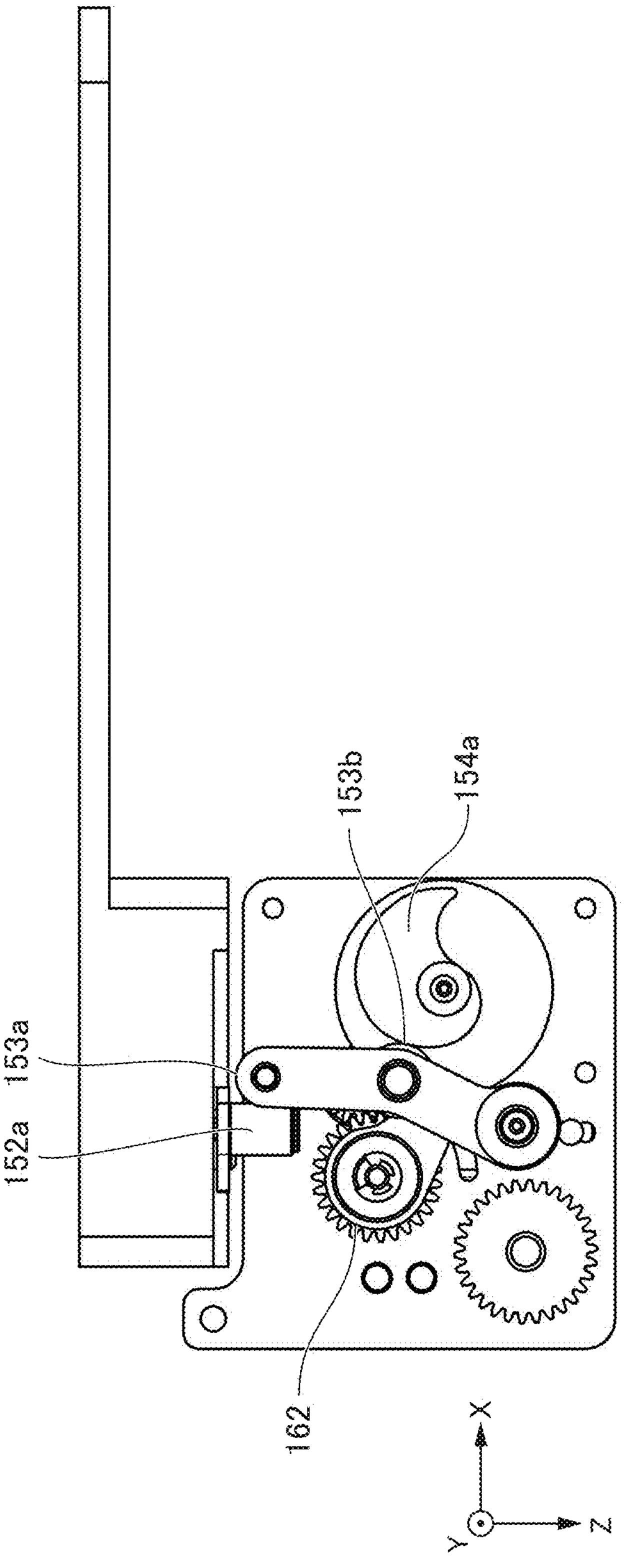
FIG. 9 is a diagram illustrating an operation of the shutter according to the embodiment.
Figure 10:
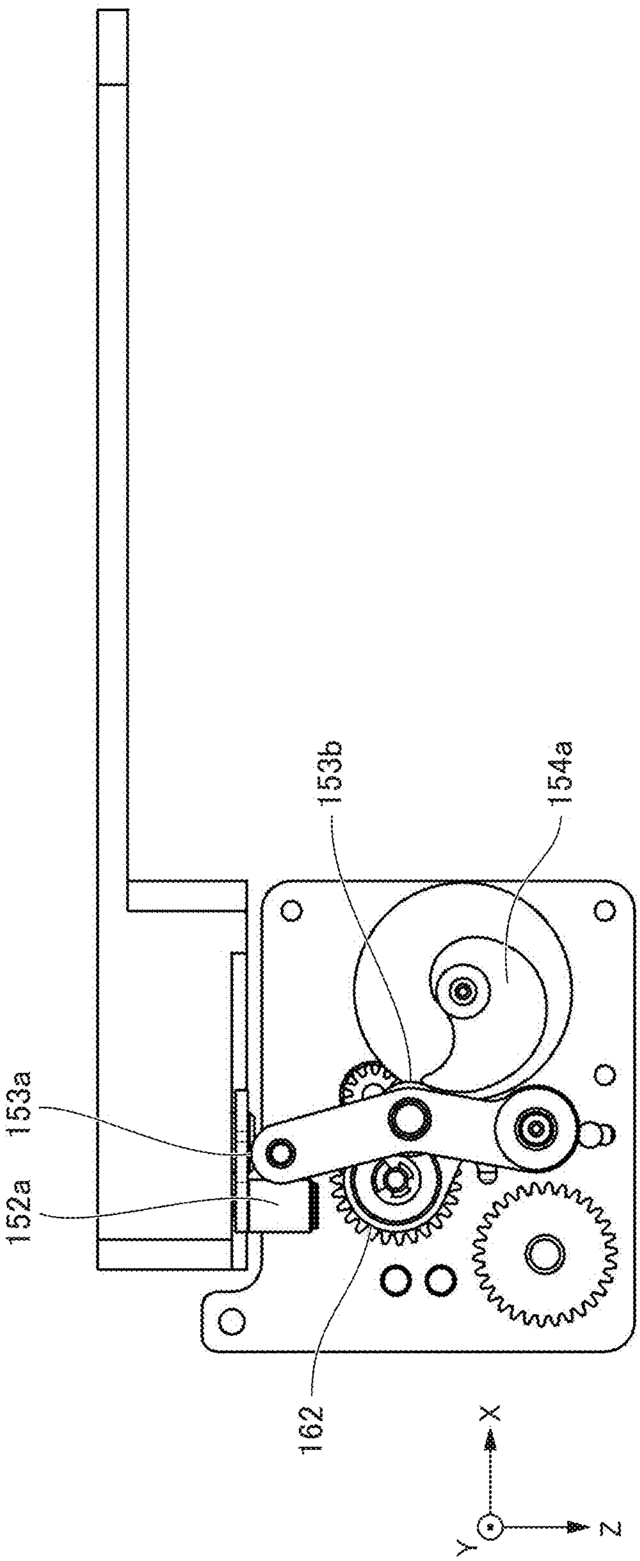
FIG. 10 is diagram illustrating an operation of the shutter according to the embodiment.

FIGS. 8 to 10 are top views of the shutter 150 in a state where motive power is transmitted from the motor 160 to the cam gear 154. Meanwhile, the state has been described with reference to FIGS. 5 and 6. The cam gear 154 meshes with gears to which the pinion gear 161, the sun gear 162, the planetary gear 163*a*, and the gear portion 154*a* are adjacent, and rotates CCW by receiving a supply of the motive power of the motor 160.

FIGS. 8 to 10 are diagrams illustrating the operation of the shutter according to the embodiment. FIG. 8 shows a state after the light shielding curtain 151 of the shutter 150 has traveled, that is, after image capture has been performed. In the state shown in FIG. 8, in order to capture an image using the shutter 150 again, an operation of moving the charge lever 152 in the left direction in the drawing and charging the spring is required.

Here, the cam follower 153*b* provided on the cam lever 153 is disposed along the lateral side of a cam portion 154*b* provided on the cam gear 154*a*, and is located near the center of the cam gear 154.

FIG. 9 shows a state in which the motor 160 is rotated CW and charging of the shutter 150 has started. The rotation of the motor 160 causes the cam gear 154 to rotate CCW and the cam lever 153 to swing with the cam follower 153*b* pressed against the lateral side of a cam portion 154*a*.

Charging is performed when the pusher 153*a* provided on the cam lever 153 presses the contact portion 152*a* of the charge lever 152 in the −X direction.

FIG. 10 shows a state where charging of the shutter 150 is completed. The cam follower 153*b* is located on the lateral side farthest from the center of the cam portion 154*a*, and the cam lever 153 is swung to its leftmost position.

After the above states shown in FIGS. 8 to 10, the cam gear 154 rotates by the driving force of the motor 160, and the charge lever 152 rotates in the charge direction. By the rotation of the charge lever 152, a spring which is incorporated inside the shutter 150 and is not shown FIGS. 8 to 10 is charged, which makes it possible to cause the light shielding curtain 151 to travel again.

Figure 11:
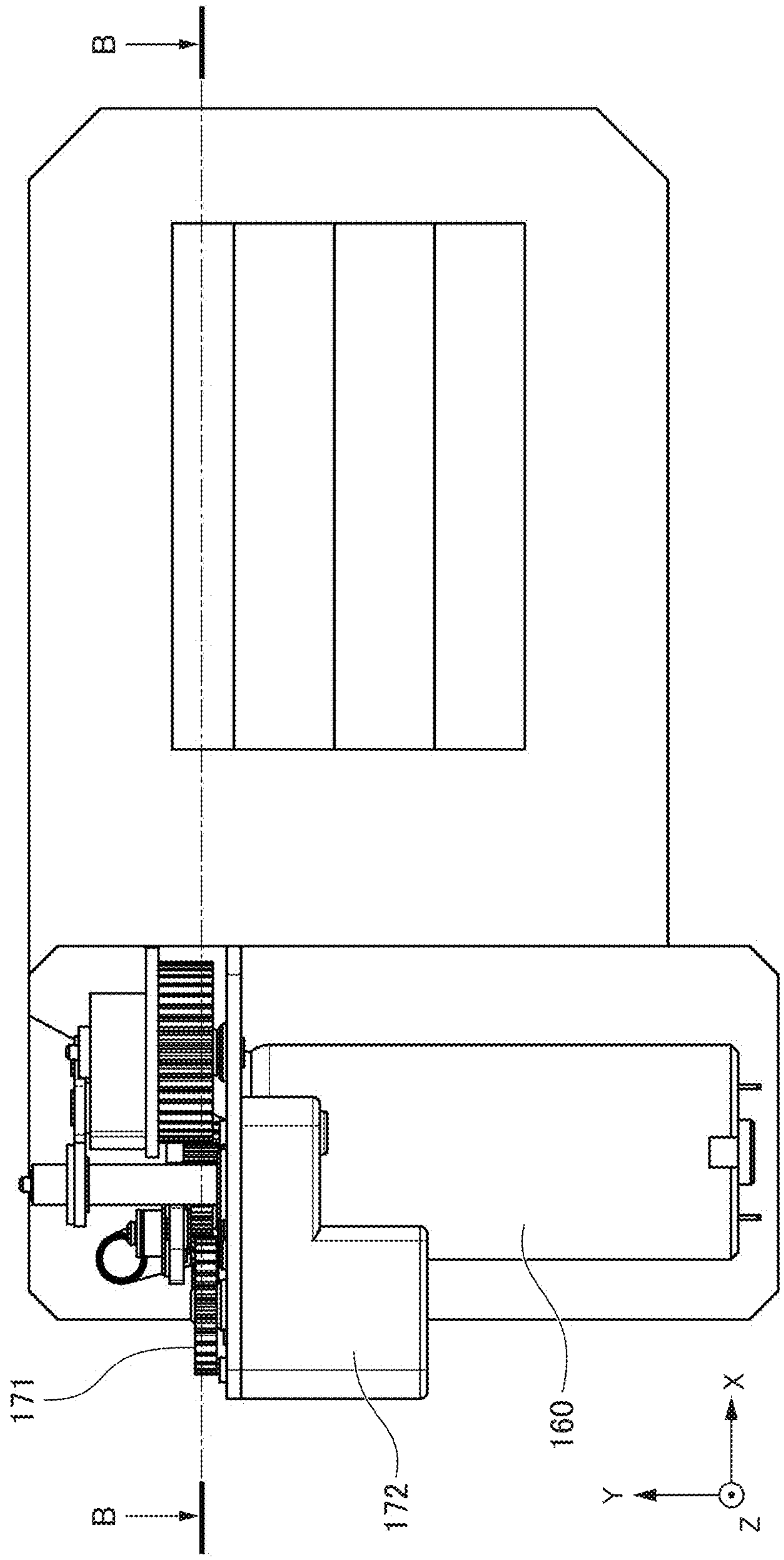
FIG. 11 is a diagram illustrating transmission of motive power of the vibration unit according to the embodiment.
Figure 12:
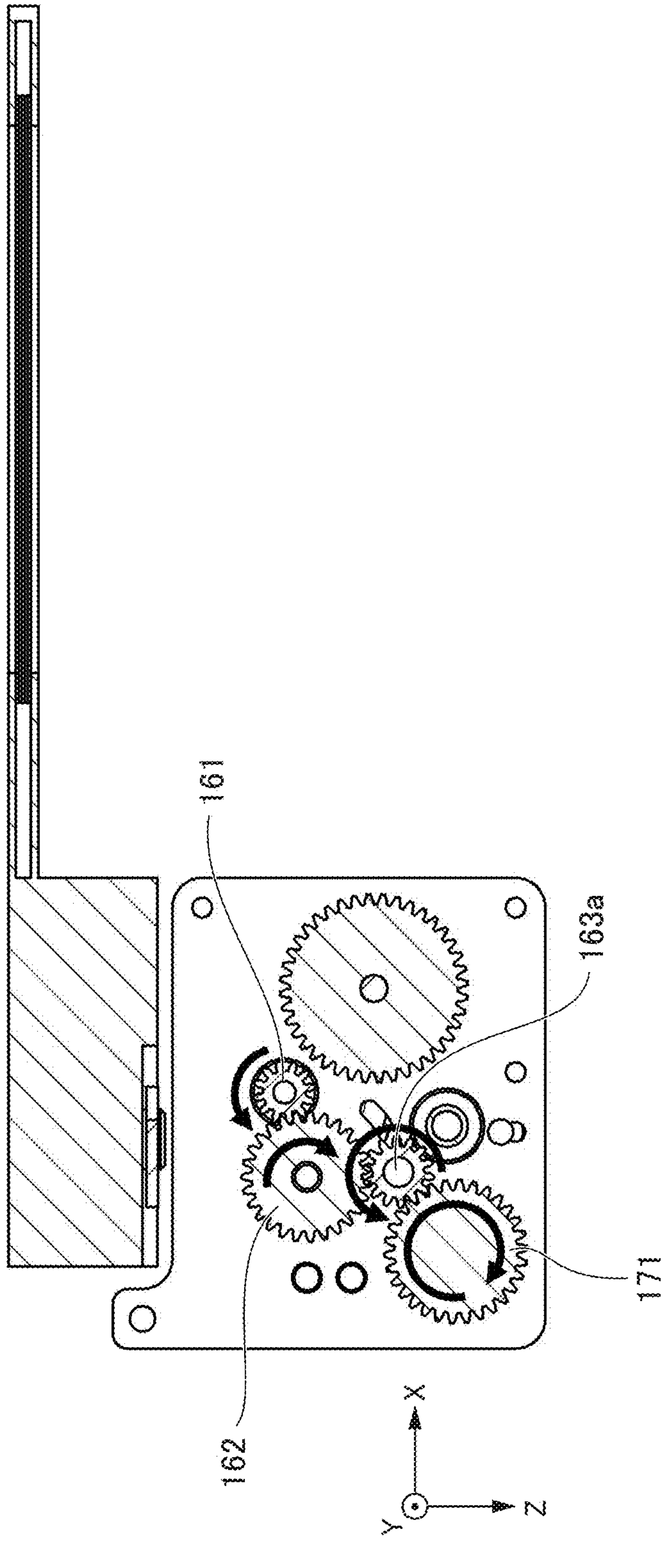
FIG. 12 is a diagram illustrating transmission of motive power to the vibration unit according to the embodiment.

Next, the transmission of driving force from the motor 160 to the vibration unit 170 will be described with reference to FIGS. 11 and 12. FIGS. 11 and 12 are diagrams illustrating the transmission of motive power to the vibration unit according to the embodiment. FIG. 11 is a front view of the shutter 150 and the vibration unit 170. FIG. 12 is a cross-sectional view along line B-B of the shutter 150 and the vibration unit 170.

As shown in FIG. 12, in a case where the pinion gear 161 attached to the driving shaft of the motor 160 rotates CCW, the sun gear 162 rotates CW. The planetary gear 163*a* moves with the rotation of the sun gear 162 and meshes with a charge gear 171, causing the charge gear 171 to rotate CW.

Next, the operation of the vibration unit 170 generating vibration by the rotation of the motor 160 will be described with reference to FIGS. 13 to 17.

Figure 13:
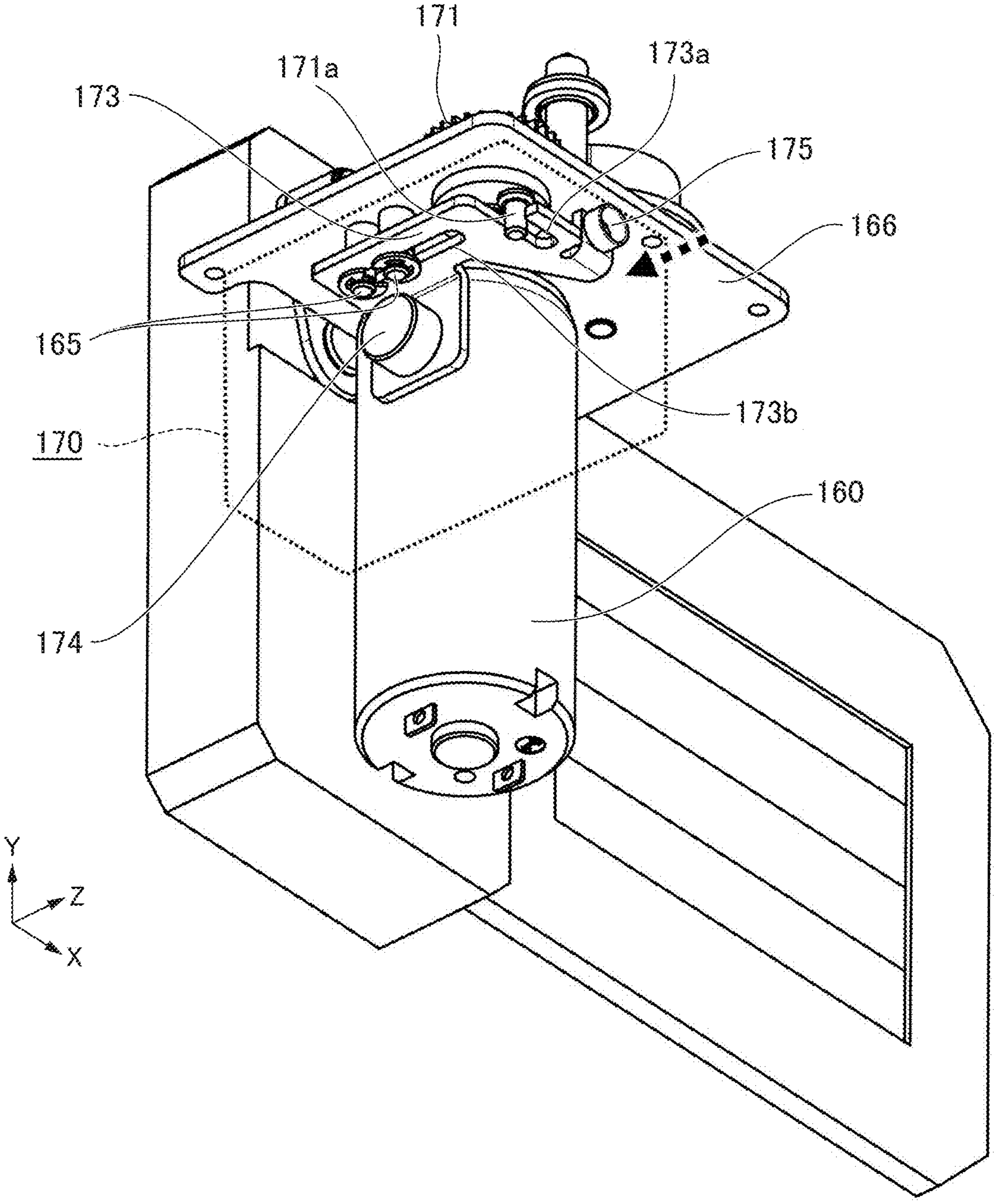
FIG. 13 is an exterior perspective view illustrating a configuration of the vibration unit according to the embodiment.

FIG. 13 is an exterior perspective view illustrating the configuration of the vibration unit according to the embodiment. Specifically, FIG. 13 is a perspective view of the shutter 150 and the vibration unit 170 viewed from the left diagonally down. In addition, FIG. 13 shows a state shown in FIG. 4 with the cover member 172 covering the vibration unit 170 removed.

The charge gear 171 extends downward and includes an eccentric shaft 171*a*. A slider 173 has openings of a charge groove 173*a* and a slider groove 173*b*. In addition, the eccentric shaft 171*a* is engaged with the charge groove 173*a*.

The slider groove 173*b* is engaged with two support shafts 165. The slider 173 is held slidably in the direction of the slider groove 173*b*. A charge spring 175 is pressed against the slider 173, and is charged in the direction of an arrow shown by the dashed line in FIG. 13.

In addition, the slider 173 has a weight 174 attached thereto. The weight 174 is made of a metal or the like having a relatively large specific gravity, and generates vibration that a photographer can feel with his or her hand by the weight reciprocating at high speed.

FIGS. 14 to 17 are diagrams illustrating the operation of the vibration unit according to the embodiment to generate vibration. In addition, FIGS. 14 to 17 are views of the vibration unit 170 viewed from below, and show a state in which the cover member 172 has been removed as in FIG. 13. In addition, specifically, FIGS. 14 to 17 show a state in which the slider 173 reciprocates with the rotation of the charge gear 171.

As described with reference to FIGS. 11 and 12, in a case where the motor 160 rotates CCW, motive power is transmitted to the charge gear 171, and the eccentric shaft 171*a* starts to rotate in the CCW direction viewed from below.

Figure 14:
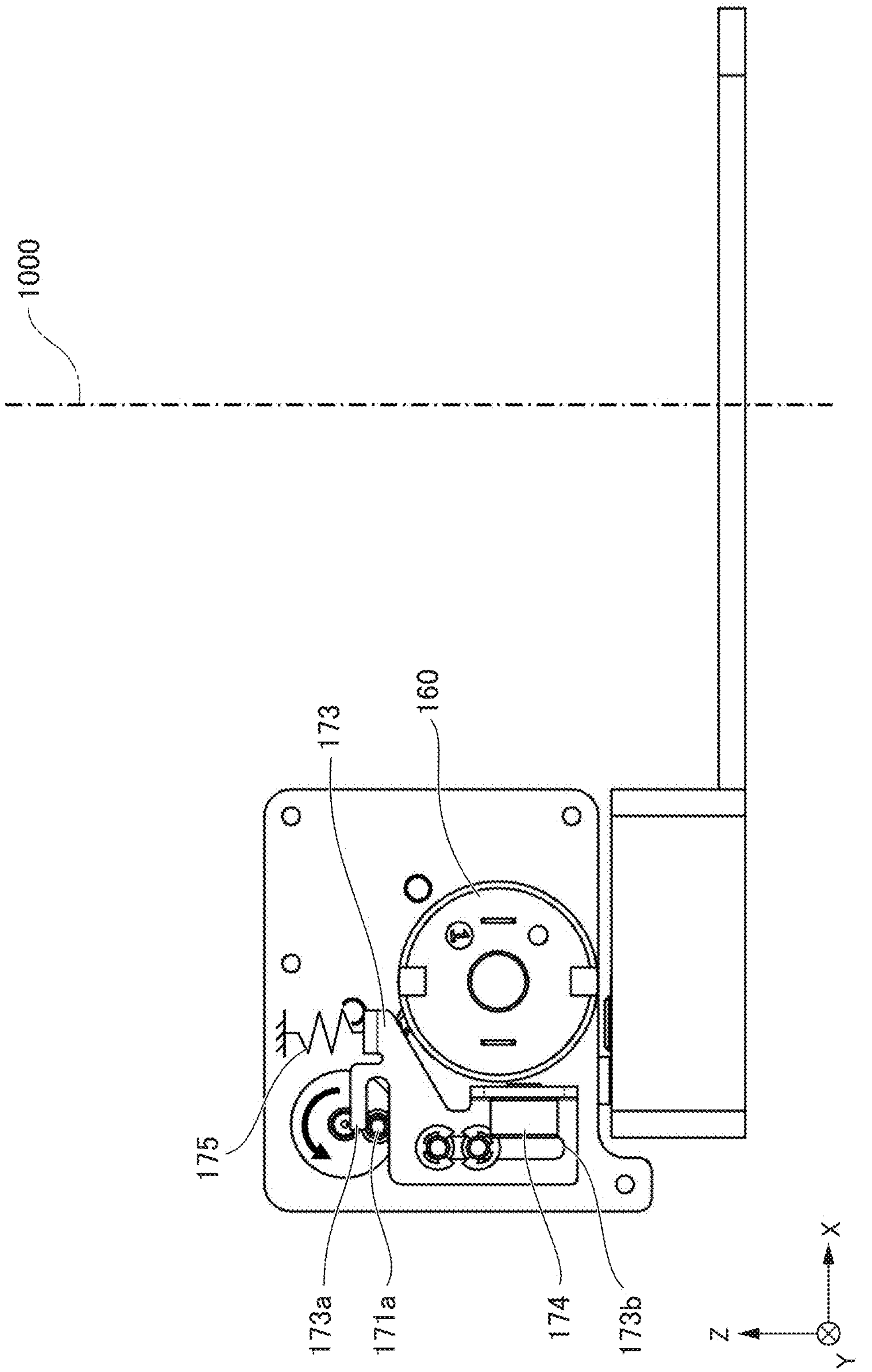
FIG. 14 is a diagram illustrating an operation of the vibration unit according to the embodiment to generate vibration.

The following description will start from FIG. 14. FIG. 14 shows a state in which the slider 173 has moved to the lower end in the drawing. In this case, as the charge gear 171 rotates CCW, the eccentric shaft 171*a* starts to engage with the charge groove 173*a*.

Figure 15:
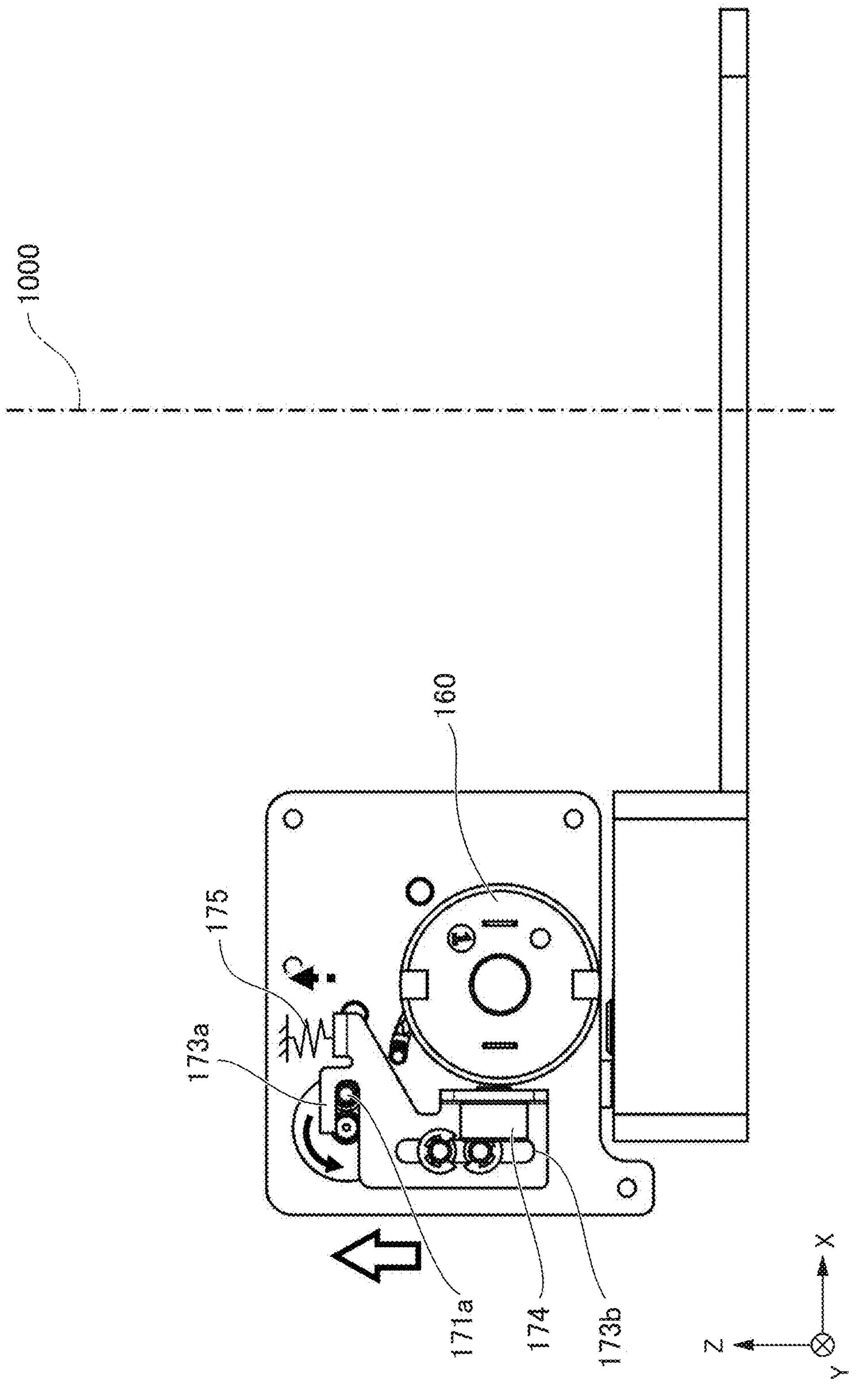
FIG. 15 is a diagram illustrating an operation of the vibration unit according to the embodiment to generate vibration.

FIG. 15 shows a state changed from the state shown in FIG. 14 to the next stage. As shown in FIG. 15, as the eccentric shaft 171*a* engaged with the charge groove 173*a* rotates CCW, the slider 173 moves in the +Z direction as shown by the arrow in FIG. 15, and the charge spring 175 is compressed.

Figure 16:
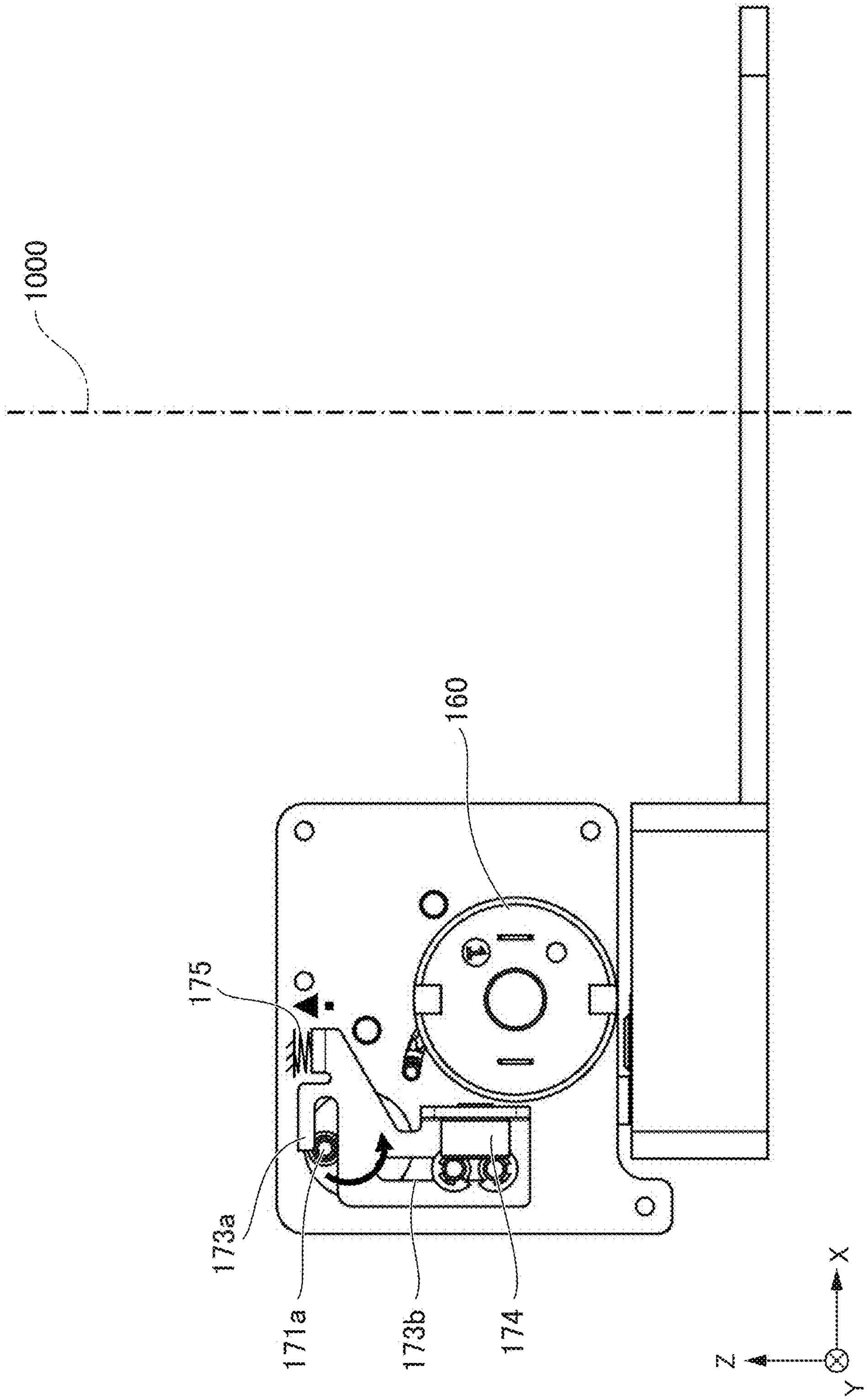
FIG. 16 is a diagram illustrating an operation of the vibration unit according to the embodiment to generate vibration.

If the eccentric shaft 171*a* reaches the position shown in FIG. 16, the slider 173 stops to move. In this case, the charge spring 175 is in the most compressed state.

Here, an optical axis 1000 shown in FIGS. 14 to 17 is normal to the imaging surface of the imaging element 22. The slider 173 vibrates in the same direction as the optical axis 1000. By vibrating the imaging element 22 in the normal direction in this way, it is possible to obtain the effect of suppressing the movement of the imaging element 22 in its planar direction while transmitting vibration to the photographer's hand, and reducing the risk of hand shaking.

After the charge spring 175 is released and the slider 173 moves to the lower end, they return to the state shown in FIG. 14 again, and vibration is generated repeatedly by continuing to rotate the charge gear 171. In addition, it is also possible to attach a phase detection unit such as an encoder (not shown) onto the shaft of the motor 160 or the charge gear 171, and to control the timing of vibration by controlling the rotation.

An example in which the shutter 150 and the vibration unit 170 are driven by the motor 160 has been described so far. The planetary gear 163*a* moves by changing the direction of rotation of the motor 160, and the shutter 150 is operated, thereby allowing the vibration unit 170 to be driven.

Normally, in a case where image capture is performed using the mechanical shutter 150, the driving operation of the light shielding curtain 151 generates vibration and sound, which makes it possible for the photographer to perform image capture while measuring the timing. On the other hand, in a case where image capture is performed using the electronic shutter function of the imaging element 22 without using the mechanical shutter 150, no sound or vibration is generated Some models have a function of emitting a simulated shutter sound from a speaker, but there is also concern that this may reduce the benefit of quietness. In addition, there is also a method of generating vibration by mounting a vibration device containing a separate actuator, but there is concern that this may increase the size and weight of the main body.

Consequently, by using the configuration of the present invention, in a case where an electronic shutter is used, notification based on vibration is possible while suppressing any increase in the size and weight of the digital camera 100 by driving the vibration unit 170 using the motor 160 which is the driving actuator of the shutter 150.

In addition, by covering the vibration unit 170 with the cover member 172 to suppress the generation of driving noise as much as possible, the photographer can measure the timing of image capture through vibration while enjoying the benefit of the quietness of the electronic shutter.

In the above-described embodiment, the vibration unit 170 is configured to vibrate by releasing the compression spring, but the present invention is not limited to these embodiments, and other configurations may be adopted, such as, for example, generating vibration by rotating an eccentric weight instead of the charge gear 171.

In addition, in the above-described embodiment, the configuration in which the transmission of driving force to the shutter 150 and the vibration unit 170 is switched depending on the direction of rotation of the motor 160 has been described, but the driving destination may be switched using a different configuration.

Figure 18:
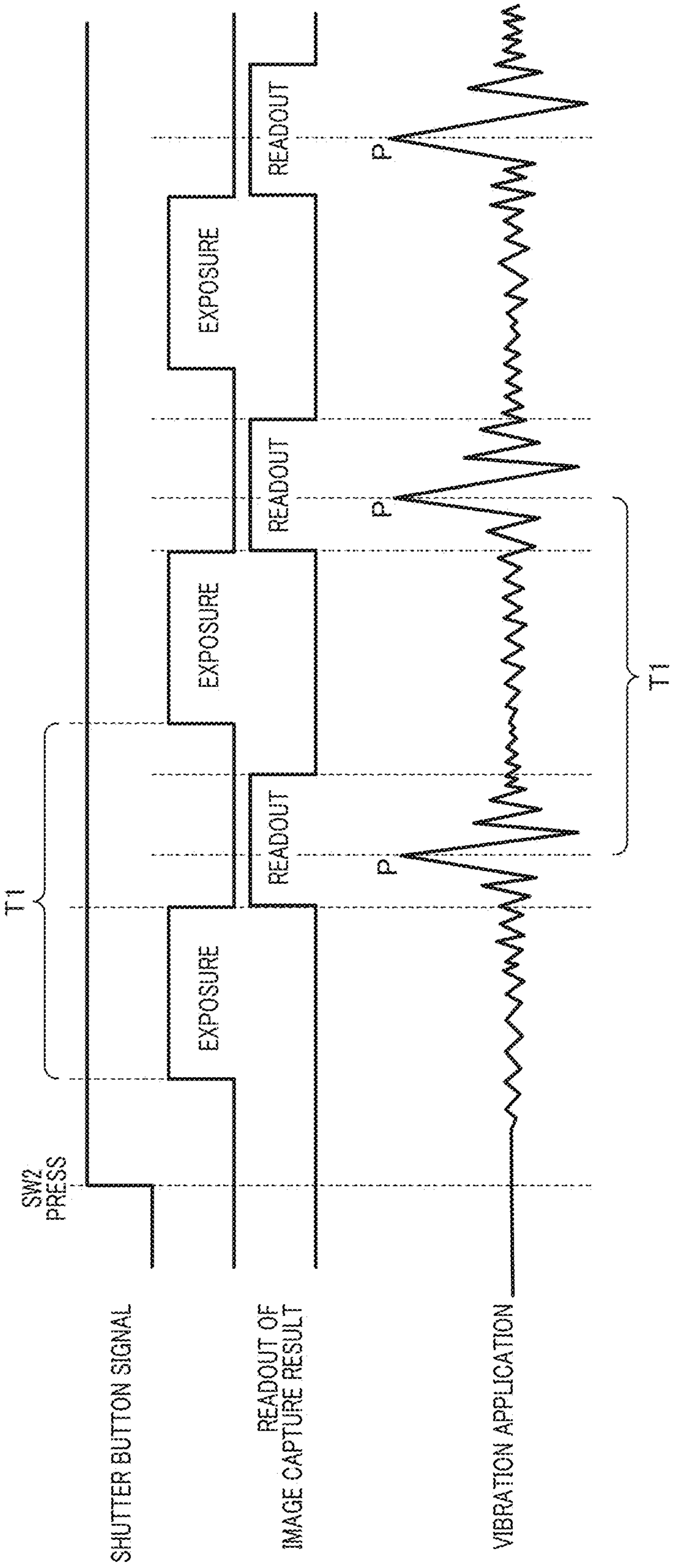
FIG. 18 is a schematic sequence diagram in a case where the imaging device according to the embodiment continuously captures images.

Next, a sequence when image capture according to the embodiment is executed will be described with reference to FIGS. 18 and 19. FIG. 18 is a schematic sequence diagram in a case where the imaging device according to the embodiment continuously captures images.

Specifically, FIG. 18 shows a sequence diagram in a case where, in a case where an electronic shutter is used, the shutter button 61 is pressed and image capture is executed continuously. In a state where the imaging mode of the digital camera 100 is set to continuous shooting, continuous image capture can be performed as shown in FIG. 18 by the shutter button 61 (SW2) continuing to be pressed.

Insofar as the shutter button 61 continues to be pressed, exposure to the imaging element 22 and readout of the image capture results are repeatedly performed at a fixed image capture interval T1. FIG. 18 assumes a continuous shooting sequence based on an electronic shutter, and the vibration unit 170 notifies the photographer of the imaging operation through vibration as described with reference to FIGS. 11 to 17.

Figure 17:
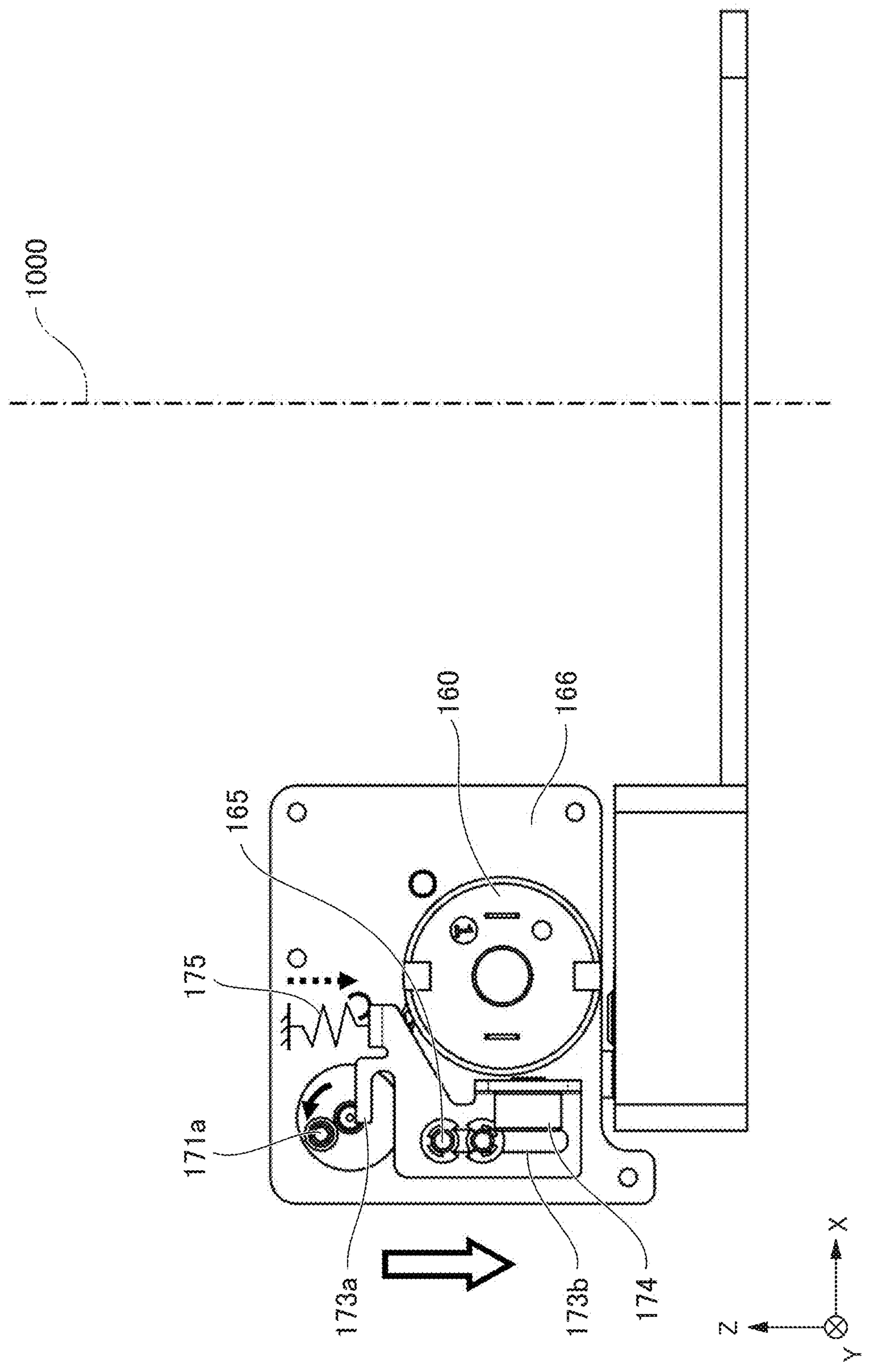
FIG. 17 is a diagram illustrating an operation of the vibration unit according to the embodiment to generate vibration.

Here, the vibration peak P at which the vibration is felt most strongly is considered to occur at the moment when the charge spring 175 shown in FIG. 17 is released and the end of the slider groove 173*b* of the slider 173 collides with the support shaft 165.

In the sequence shown in FIG. 18, the number of rotations of the motor 160 is controlled so that the timing at which the vibration peak P occurs is repeated at the same interval as the image capture interval T1. If the motor 160 is stopped after each image capture, the digital camera 100 may take time to restart and may not be able to cope with very high speed continuous shooting.

However, by controlling the number of rotations of the motor 160 in this way and synchronizing the continuous shooting timing with the vibration peak P, the digital camera 100 can apply vibration in accordance with the image capture timing without stopping the motor 160.

In addition, the rotation of the motor 160 is controlled so that the vibration peak P occurs during readout of the image capture results rather than during exposure of the imaging element 22. The risk of blurring of an image can be reduced by preventing the vibration of the vibration unit 170 from increasing during exposure in this way.

Figure 19:
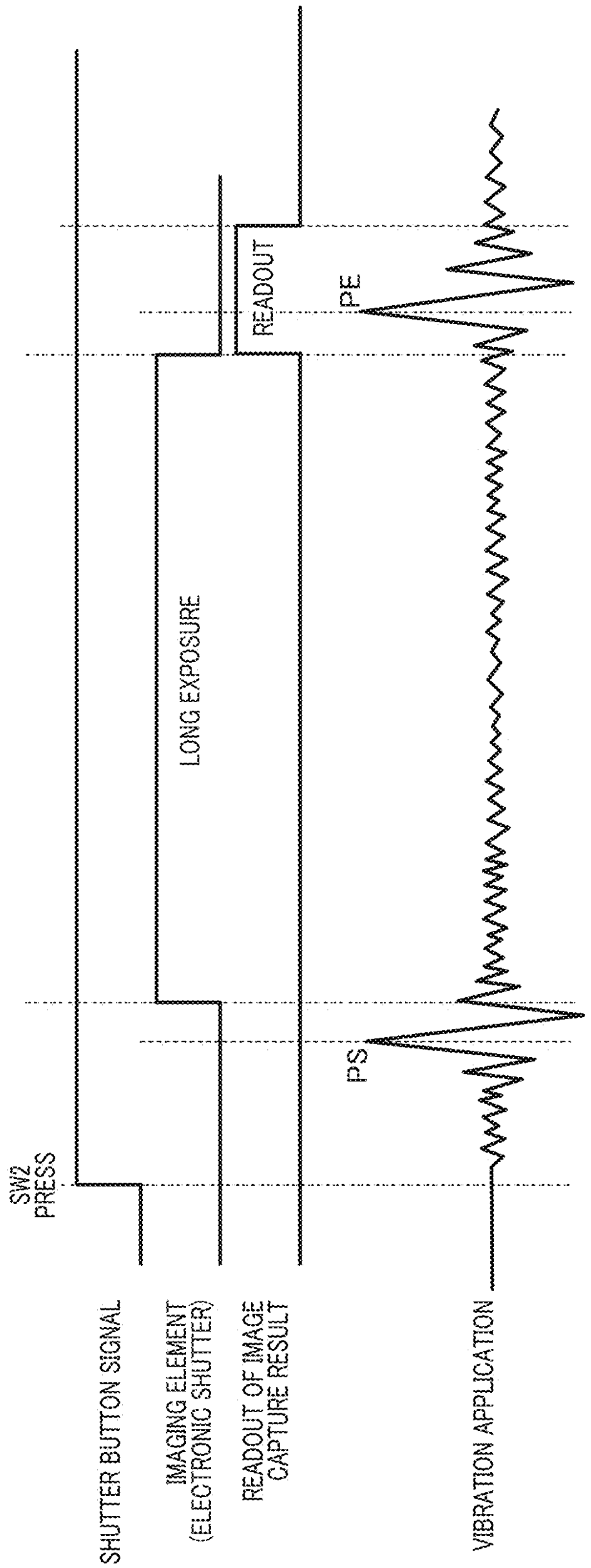
FIG. 19 is a schematic sequence diagram in a case where the imaging device according to the embodiment performs long exposure.

FIG. 19 is a schematic sequence diagram in a case where the imaging device according to the embodiment performs long exposure. Specifically, FIG. 19 shows a schematic sequence diagram in a case where image capture of long exposure is performed in the electronic shutter state. In a mechanical shutter, two light shielding curtains, called a front curtain and a rear curtain, travel, and the time of exposure to the imaging element 22 is controlled by controlling the difference in the travel time therebetween.

Therefore, for example, in a case where long exposure of more than one second is performed, the vibration caused by the travel of the front curtain and the vibration caused by the travel of the rear curtain are transmitted separately, which makes it possible for the photographer to know when the exposure has started and ended.

Consequently, as shown in FIG. 19, in a case where an electronic shutter is used and a long exposure is executed, the digital camera 100 can achieve the same notification effect by applying vibration (vibration PS) before the exposure starts and applying vibration (vibration PE) again after the exposure ends.

In addition, if the exposure time is short, the digital camera 100 will not allow the user to perceive a plurality of vibrations. Therefore, the digital camera 100 can provide a notification function appropriate for image capture by switching between a sequence in which vibration is applied once for each shot as shown in FIG. 19 and a sequence in which vibration is applied before and after exposure as shown in FIG. 19, in accordance with the setting of the exposure time.

Meanwhile, the vibration unit 170 can be driven even during other than shooting with an electronic shutter, and may be used to provide various notifications to the photographer such as, for example, providing a feeling of operation to various operating members or warning the photographer about the remaining battery power of the camera.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging device or the like through a network or various storage media. Then, a computer (or a CPU, an MPU, or the like) of the imaging device or the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-158726, filed on Sep. 22, 2023, which is hereby incorporated by reference herein in its entirety.

What is claimed is:

1. An imaging device comprising:

an actuator;

a light shielding curtain configured to operate by receiving a supply of motive power generated by the actuator to control exposure to an imaging element;

a vibrator configured to generate vibration by receiving a supply of the motive power generated by the actuator; and a gear assembly configured to supply the motive power of the actuator to the light shielding curtain in a case where a mechanical shutter is used, and to supply the motive power of the actuator to the vibrator in a case where an electronic shutter is used, wherein the vibrator includes a vibration member that vibrates in a normal direction of an imaging surface of the imaging element.

2. The imaging device according to claim 1, wherein the vibrator generates vibration by applying force to an elastic member that biases the vibration member to cause elastic deformation and then releasing the elastic member.

3. The imaging device according to claim 1, further comprising a cover member configured to cover at least a portion of the vibrator.

4. The imaging device according to claim 1, wherein, in a case where images are captured continuously, the vibrator generates vibration at a constant timing relative to a timing of exposure to the imaging element.

5. The imaging device according to claim 1, wherein the actuator includes a motor, and rotates a rotor in a first direction in a case where the mechanical shutter is used and rotates the rotor in a second direction which is a direction opposite to the first direction in a case where the electronic shutter is used.

6. The imaging device according to claim 1, wherein the gear assembly is configured to supply the motive power of the actuator to the vibrator during a readout period of the imaging element other than exposure period in a case where an electronic shutter is used.

* * * * *